April 18, 1967  H. W. McDONOUGH  3,314,284
FORCE GAUGING SYSTEM
Filed Feb. 14, 1964
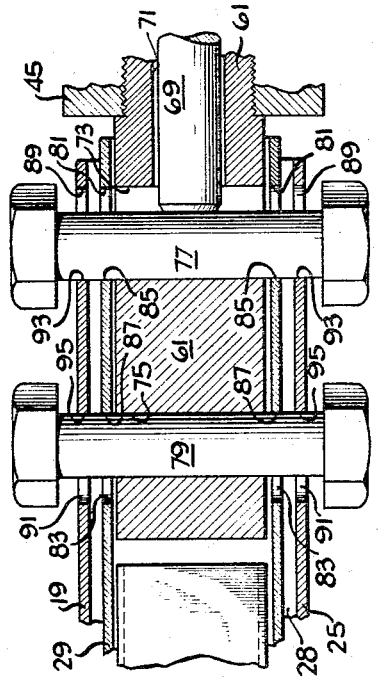
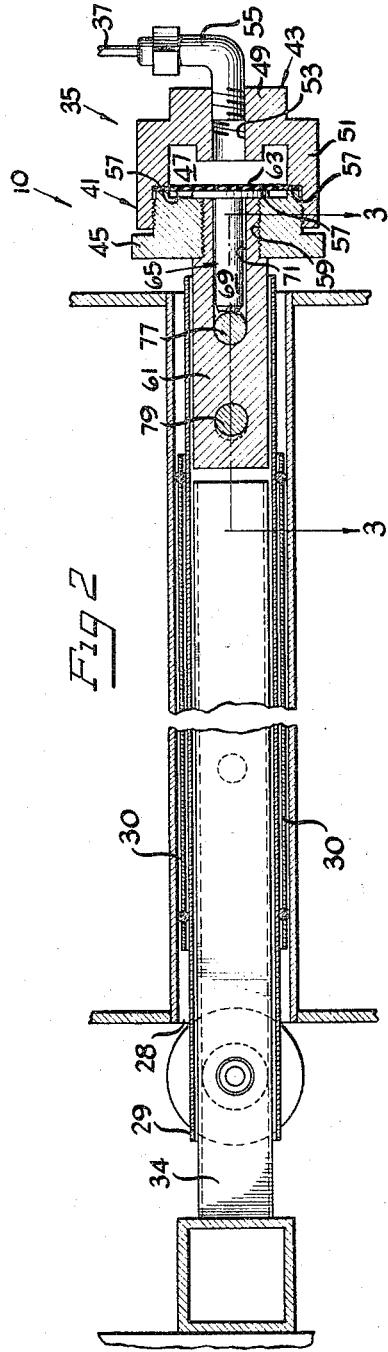
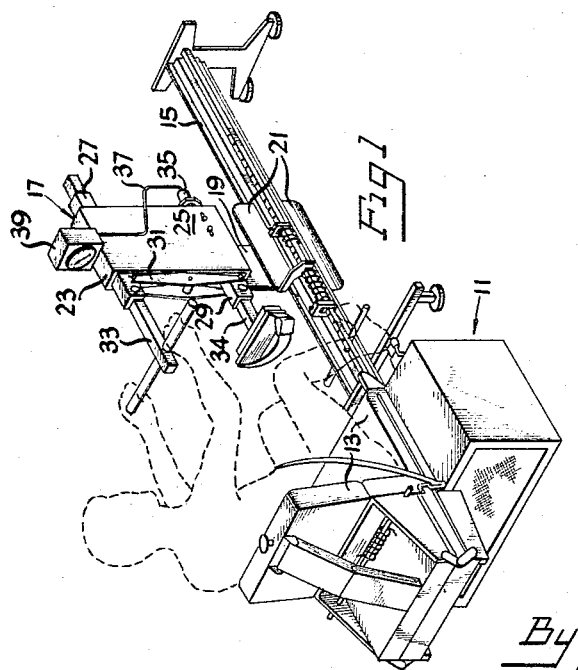
Inventor
Henry Wilmot McDonough
By Anderson, Luedeka, Fitch, Even & Tabin
Atty's

United States Patent Office 3,314,284
Patented Apr. 18, 1967

3,314,284
FORCE GAUGING SYSTEM
Henry Wilmot McDonough, Dundee, Ill., assignor to Elgin Elmac Enterprises, Inc., a corporation of Illinois
Filed Feb. 14, 1964, Ser. No. 345,051
7 Claims. (Cl. 73—141)

This application is a continuation-in-part of copending application Ser. No. 291,234, filed June 26, 1963.

This invention relates to gauging devices and, more particularly, to devices capable of providing an indication of the force exerted by an individual during certain forms of muscular evaluation and/or exercising activities.

Certain forms of muscular exercising and evaluation apparatus, particularly apparatus such as are shown in U.S. Patent No. 3,285,070 and U.S. patent application Ser. No. 314,116, include a device for determining the amount of force exerted by an individual during certain forms of muscular activity. In the apparatus of application Ser. No. 314,116, for example, there is provided a carriage movable toward and away from a user, and a gauging unit mounted on the carriage and adapted to indicate the magnitude of the force which the user exerts in resisting the movement of the carriage.

With such apparatus, it is frequently desirable to obtain a continuous indication of the magnitude of the force exerted by the user as the carriage moves, as well as an indication of the magnitude of the force exerted in each of a number of positions in which the carriage or other structural member is stationary relative to the user. A gauging unit utilized with such an apparatus preferably provides the desired indication of force with a minimum of movement internally of the gauge since such movement would make it difficult to determine the exact position at which the force was exerted. Also, since a moving body possesses a certain amount of momentum, such movement detracts from the accuracy of the indication obtained.

In addition, it is desirable that the gauging unit be equally responsive to forces exerted by the user in each of two directions, e.g., push and pull forces, since the exertion of such forces involves two different forms of muscular contraction, i.e., concentric and eccentric. Accordingly, in the use of the above-mentioned apparatus, it is desirable that the gauging unit measure the force exerted in resisting movement of the carriage both toward and away from the user.

The principal object of the present invention is to provide an improved gauging unit.

Another object of the present invention is to provide an improved gauging unit particularly adapted for use with muscular exercising and evaluating apparatus.

A further object of the invention is to provide a gauging unit which is capable of providing an indication of the force exerted by the user with a minimum amount of movement of certain portions of the body of the user relative to the gauging unit.

A still further object of the invention is to provide an improved gauging unit which is responsive to forces exerted in either of two opposite directions.

An additional object of the invention is to provide an improved gauging unit which is economical to produce, reliable in operation, and durable in construction.

Other objects and advantages of the invention will become apparent with reference to the following description and the accompanying drawings.

In the drawings:

FIGURE 1 is a perspective view of an apparatus embodying a gauging unit showing various features of the invention;

FIGURE 2 is an enlarged fragmentary elevational view of a portion of the apparatus of FIGURE 1 showing the gauging unit in greater detail; and FIGURE 3 is a sectional plan view taken along line 3—3 of FIGURE 2.

The gauging unit 10 of the present invention is particularly adapted to be utilized with any of a variety of exercising apparatus, including apparatus such as is shown in Patent No. 3,285,070, which evaluate the forces exerted by muscles or muscle sets during isometric contractions, and apparatus such as is shown in application Ser. No. 314,116, which evaluate forces exerted by muscles or muscle sets during isotonic as well as isometric contractions. In the following discussion, the gauging unit will be described with respect to its incorporation in one specific form of exercising apparatus. However, it is to be understood that the unit is not limited to use with such apparatus.

Referring now in greater detail to the apparatus, there is provided a body support 11 having mounted therein a plurality of cushions 13 which can be caused to define a seat and backrest, as illustrated, or a horizontal platform (not shown). These cushions therefore support the body of a user in either a seated or a prostrate position. The body support 11 also houses the power means (not shown) of the apparatus.

A rail 15 extends forwardly from the body support 11, i.e., away from the body support in the direction faced by a user seated thereon, and defines a track upon which a carriage 17 travels toward and away from the body support in a reciprocating manner. The carriage is formed of a vertically disposed plate 19 positioned adjacent one side of the rail 15 and has mounted thereon adjacent its lower end a plurality of wheels (not shown) which are enclosed by shields 21 and which engage the rail 15. A housing 23, partially defined by a face plate 25, is supported on the upper portion of the plate 19 and provides an upper channel (not shown) within which an upper tubular member 27 is slidably supported and a lower channel 28 (FIG. 2) within which a lower tubular member 29 is slidably supported on bearing plates 30. Each of the tubular members are of square cross section. The tubular members are interconnected by a linkage 31 (FIG. 1) so that a force exerted on one will be transmitted to the other, and each has connected thereto an adjustable member 33 and 34 respectively through which such force may be exerted.

The gauging unit 10 comprises a transducer 35 mounted at the forward end of the lower tubular member 29 and capable of translating longitudinally directed forces applied to the lower tubular member 29 into a fluid pressure, whether these forces be applied directly, as when the feet of the user engage the adjustable member 34, or are transmitted from the upper tubular member 27 through the linkage 31. The fluid pressure within the transducer 35 is transmitted through a conduit 37 to an indicator 39 which provides a reading, preferably in units of force. The gauging unit 10 is responsive to both push and pull forces, thus rendering it effective to indicate push and pull forces applied to the carriage incident to both eccentric and concentric isometric and isotonic muscular contractions.

More specifically, the transducer 35 comprises (FIG. 2) a generally cylindrical body 41 which includes a cup section 43 and a cap section 45 threadedly interconnected to define an internal cavity 47. The cup section 43 includes a generally circular end wall 49 and a generally cylindrical side wall 51. The end wall 49 is provided with abutments on each of its outer and inner faces respectively, and a hole 53 extends centrally through the abutments and receives an L-shaped fitting 55 which provides a connection between the transducer and the conduit 37. The outer edge portion of the cylindrical side wall 51 is machined to provide a somewhat greater internal diameter terminating in a shoulder 57, and is threaded to receive the cap section 45.

The cap section 45 is generally cylindrical in shape and is flanged adjacent its outer end so as to facilitate insertion into the cup until the peripheral portion of its inner end is disposed immediately adjacent the shoulder 57 of the cap. A hole 59 extends centrally through the cap and receives the threaded neck of a relatively short square shaft or bar 61 having a configuration similar to, but dimensions less than, the interior of the lower tubular member 29. The shaft extends outwardly of the cap section 45 and is received within the hollow of the lower tubular member 29, as hereinafter described.

The cavity 47 of the transducer body 41 is divided into a forward and rearward chamber by a generally circular diaphragm 63 clamped between the forward peripheral portion of the cap section 45 and the shoulder 57. The forward chamber (to the right in FIG. 2) is filled with an oil or similar fluid which also occupies the conduit 37 and a portion of the indicator 39. A piston 65 occupies a portion of the rearward chamber and comprises a flat circular disk 67 and a piston rod 69. The disk 67 is disposed in face to face contact with the rearward surface of the diaphragm 63, and the rod 69 extends outwardly from the disk through a bore 71 provided in the square shaft 61, previously referred to.

It will be seen that when the piston 65 is moved forwardly (to the right, FIG. 2), the fluid within the transducer is placed under pressure and a reading is provided on the indicator 39. In like manner, if the piston is maintained in a stationary position but the transducer body 41 is moved rearwardly (to the left, FIG. 2), the fluid will again be placed under pressure and a reading again provided. Relative movement between the transducer body and the piston is effected, whenever a force is applied to the lower tubular member 29, by virtue of a unique connection between the transducer, the member 29, and the carriage 17, hereinafter described.

More specifically, the square shaft 61, which is rigidly connected to the transducer body 41 and which is provided with a bore 71 to receive the rod 69 of the piston 65, is also provided with a transverse slot 73 adjacent to, and in communication with, the inner end of the bore 71. The shaft 61 is further provided with a transverse circular hole 75 spaced rearwardly (to the left, FIGS. 2 and 3) of the slot 73. Each the slot 73 and hole 75 receive pins 77 and 79 respectively. However, the slot 73 is so disposed relative to the bore 71 that, when the pin 77 is positioned in the slot, the rearward end (left, FIG. 3) of the piston rod 69 abuts the side wall of the pin. Moreover, the slot 73 is elongated in the direction of the length of the shaft 61, thereby permitting the pin 77 to be moved forwardly in the slot relative to the shaft and, in so moving, to also urge the piston rod 69 forwardly relative to the shaft. Since the shaft 61 is affixed to the transducer body 41, movement of the piston relative to the shaft results in movement of the piston relative to the transducer body as well.

The body of the shaft 61 is carried within the forward end of the lower tubular member 29 and is maintained therein by the pins 77 and 79 which project through horizontally spaced slots 81 and 83 respectively located in opposite side walls of the tubular member. The slots 81 and 83, like the slot 73 in the square shaft 61, are elongated in the direction of the length of the tubular member 29 and, from FIGURE 3, it will be noted that the distance between the rearward (left) edge 85 of the slots 81 and the forward (right) edge 87 of the slots 83 is equal to the distance between the rearward wall of the slot 73 and the forward wall of the hole 75. Also, when the apparatus is not being operated, the pin 77 is disposed in abutting relation to the rearward wall of the slot 73.

It should now be understood that since the pin 77 is in engagement with the piston rod 69, and since the square shaft 61 is affixed to the transducer body 41, movement of the pin forwardly (to the right) relative to shaft 61 will cause relative movement between the piston and transducer body so as to create a fluid pressure within the transducer. This relative movement may be accomplished by maintaining the pin 77 and, hence, the shaft 61 and transducer body 41, stationary (there is no relative movement between the pin 79 and the shaft 61) and moving the pin 77 and, hence, the piston rod forwardly, or may be accomplished by holding the pin 77 and, hence, the piston stationary and moving the pin 79, and with it the square shaft 61 and transducer body 41, rearwardly. The pins 77 and 79 are alternately moved by forward or rearward movement of the lower tubular member 29, as when a force is applied thereto, and are alternately maintained in a stationary position by engagement thereof with the carriage 17, as hereinafter described.

More particularly, the lower tubular member 29, within which the square shaft 61 is carried, is disposed, as has already been mentioned, within a lower channel 28 on the carriage 17. The channel is defined on opposite sides by the vertically disposed backing plate 19 and by the face plate 25, which plates are stationary insofar as the carriage is concerned. These plates are provided with forward and rearward slots 89 and 91 respectively elongated in a horizontal direction and spaced horizontally from one another such that the distance between the rearward (left) edge 93 of the slot 89 and forward (right) edge 95 of slot 91 is equal to the distance between the rearward edge 85 of slot 81 and the forward edge 87 of slot 83 of the lower tubular member 29. The ends of the pins 77 and 79 protrude through the slots 89 and 91, and these pins may be capped at their outer ends to prevent them from being inadvertently withdrawn.

In the operation of the gauging unit 10, when a force directed toward the right (FIGS. 2 and 3) is applied to lower tubular member 29, as by a pushing force applied directly thereto or by a pulling force applied to the upper tubular member 27 and transmitted through the linkage 31, the pin 79 remains stationary in abutting relation to the edge 95 of slots 91 in plates 19 and 25, thus maintaining the square shaft 61 and, hence, the transducer body 41, stationary as well. The tubular member 29, however, is free to move relative to the pin 79 by virtue of the shape of the slots 83 provided therein and such movement causes movement of the pin 77 relative to the square shaft 61 within the slot 73 in the shaft. This movement of the pin 77 relative to the shaft causes forward (to the right) movement of the piston rod 69 within the bore 71 of the shaft 61 and, since this is accomplished while the shaft 61 and transducer body 41 are stationary, the fluid within the transducer is placed under pressure.

Movement of the lower tubular member 29 in the rearward direction (to the left in FIGS. 2 and 3), as when a pulling force is applied to the member 29 or a pushing force is applied to the member 27, is accomplished while the pin 77 is stationary by virtue of its engagement with the rearward (left) edges 93 of the slots 89. However, the pin 79, the square shaft 61 and the transducer body 41 are moved rearwardly as a unit. Since the piston rod 69 abuts the pin 77, thus maintaining the piston in a stationary position, this rearward movement of the tubular member effects movement of the transducer body 41 relative to the piston and a fluid pressure is again created within the transducer.

It will be appreciated that the movements of the above described elements are very slight e.g., ⅛ inch or less. This slight movement is negligible and does not affect the accuracy of the evaluation where it is desired to maintain at a constant value the distance through which the body or a portion thereof moves.

The function of the indicator 39 is to provide an accurate indication of the force applied by the user to the lower tubular member 29 by virtue of the pressure created on the fluid carried within the cavity 47 of the transducer body 41, within the conduit 139, and within the indicator itself. It is anticipated that the indicator will be mounted at a location to which a user of the system has visual access and, in the illustrated embodiment, is carried in a housing mounted on the carriage 17.

Various forms of devices sensitive to variation in fluid pressure may be employed in the specific embodiment of the gauge shown, but a conventional Bourdon gauge in which the pressure created within the transducer unit is exerted on the interior of a metal tube (not shown), oval in cross section and bent to fit into a circular case, has been found to be preferable. The application of pressure tends to make the cross section of the tube round and thus to unroll or straighten the tube. This motion, connected by means of links, levers, a gear sector, and a pinion (not shown) rotates a hand about a calibrated dial, and the force in terms of pounds may be read.

In the use of the exercising apparatus illustrated, the gauging unit 10 enables a user to obtain an indication of the magnitude of the force applied to the carriage 17 and the force is exerted by muscles in either isotonic contraction, as when the carriage is moving, or isometric contraction, as when the carriage is at rest. It should be realized that the force exerted on the carriage will vary with the distance of the carriage from the body support 11, will vary with the particular muscles which exert the force, and when the carriage is moving, will vary with the speed at which it is traveling. The gauging unit can be utilized to accurately determine the strength of muscles, to determine a weakness in a muscle as in a portion of its range of motion, and to determine the degree to which the muscle responds to therapy.

While the gauging unit 10 has been shown and described as employing a transducer utilizing a fluid pressure, it should be clear that various other available pressure sensitive elements such as piezoelectric crystals or pressure responsive variable capacitors, might be employed as well. In such case, the pressure sensitive element might be carried within the transducer body and be engaged by an outwardly extending rod. The operation of the system would be essentially the same.

Various of the features of the invention are set forth in the following claims.

What is claimed is:

1. A force measuring system comprising a support, a member mounted on said support for movement in each of opposite but parallel directions relative to said support, a hollow transducer cell mounted on the movably mounted member for shifting movement relative thereto in each of said opposite directions, an elongated element projecting from the interior of the cell and movable relative thereto in each of said opposite directions, a medium within the cell intermediate a surface of said element and a wall of said cell engageable by the movable element so as to be placed under pressure incident to the application of opposing forces to said cell and said element in parallel relation to the directions of movement of said movably mounted member, means limiting movement of said support relative to said cell in one of said opposite directions, means effecting engagement between said element and said movably mounted member incident to a force applied to said movably mounted member in said one of said opposite directions, thereby placing said medium under pressure when movement of said cell in said one direction relative to said support is prevented, means limiting relative movement between said support and said element in the other of said opposite directions, means effecting engagement of said movably mounted member with said cell incident to a force applied to said movably mounted member in said other of said opposite directions so as to place said medium under pressure when movement of said element in said opposite direction is prevented, and means communicating with said medium adapted to indicate the force creating the pressure under which said medium is placed.

2. A force measuring system comprising a support, an elongated member mounted on said support for movement in each of opposite but parallel directions, a hollow transducer cell, a rod fixedly secured to one end of said transducer cell and telescopically arranged with respect to said elongated member for shifting movement relative thereto in each of said opposite directions, an elongated element projecting from the interior of said transducer cell through said one end thereof in telescopic relation to said elongated element and movable relative thereto in each of said opposite directions, a medium within the cell intermediate surface of said element and a wall of said cell engageable by the movable element so as to be placed under pressure incident to the application of opposing forces to said cell and said elongated element in parallel relation to the direction of movement of said elongated member, means limiting relative movement between said support and said rod in one of said opposite directions, means effecting engagement between said element and said elongated member incident to a force applied to said movably mounted member in said one of said opposite directions, thereby placing said medium under pressure when movement of said rod in said one direction relative to said support is prevented, means limiting relative movement between said support and said element in the other of said opposite directions, means effecting engagement of said movably mounted member with said cell incident to a force applied to said movably mounted member in said other of said opposite directions so as to place said medium under pressure when movement of said element in said opposite direction is prevented, and means communicating with said medium adapted to indicate the force creating the pressure under which said medium is placed.

3. A force measuring system comprising a support, an elongated member mounted on said support for movement in opposite directions, a transducer cell having a shaft fixedly secured to one end thereof telescopically arranged with respect to said elongated member and shiftable relative thereto, said shaft being provided with a longitudinal bore communicating with the interior of said cell, an elongated element projecting from the interior of the cell into said bore and movable relative to said cell, a medium within the cell engageable by the movable element and adapted to be placed under pressure incident to the application of opposing forces to said cell and said element in parallel relation to the direction of movement of said elongated member, a first pin extending through said shaft so as to be maintained in stationary relation thereto and having its ends supported in first slots in said support which are elongated in the direction of movement of said elongated member, engagement of said first pin with one end of each of said slots being effective to limit relative movement of said cell relative to said support in one direction, said first pin also passing through first slots in said elongated member, which slots are elongated in the direction of travel of said member and which permit movement of said member when said cell is rendered stationary incident to engagement between said first pin and said edges of said first slots in said support; a second pin extending through a slot in said shaft and movable therein, said slot being located at the inner end of the bore of said shaft so as to be engaged by an end of said elongated element and so as to move said elongated element when moved in said one direction, the ends of said second pin being supported in slots in said support and said elongated member, said slots being elongated in the direction of movement of said elongated member and permitting movement of said pin in said one direction, movement of said pin in said opposite direction being restrained by an edge of said slots in said support, whereby when a force is applied to said elongated member in said one direction said first pin restrains movement of said cell while said second pin transmits the force through said element to said medium so as to place said medium under pressure, and when a force is applied to said elongated member in said opposite direction said second pin restrains movement of said element in said opposite direction while said first pin transmits the force to said cell and, hence, said medium so as to place said medium under pressure, and means communicating with said medium adapted to indicate the force creating the pressure under which said medium is placed.

4. A force measuring system comprising a support, an elongated member mounted on said support for movement in opposite directions, a transducer cell shiftably mounted on the elongated member and including a hollow body defining a reservoir containing a quantity of confined liquid, a rod extending inwardly of said transducer body into adjacent relation to said reservoir and movable inwardly of said transducer body incident to a force applied to said rod in a given direction, movement of said rod inwardly of said transducer body being effective to place said liquid under a pressure proportionate to the force causing said movement, means limiting relative movement between the support and said transducer body in one direction axially of the elongated member, means limiting relative movement between said rod and said support in the opposite direction axially of the elongated member, slidable movement of the elongated member relative to the support in said one direction being thereby effective to move said rod in the direction of said transducer body so as to place said liquid under pressure, slidable movement of the elongated member relative to the support in said other direction being thereby effective to move said transducer body in the direction of said rod and again place said liquid under pressure, and means connected to said transducer in communication with said liquid and adapted to indicate the force required to place the said liquid under pressure.

5. A force measuring system comprising a support, an elongated member mounted on said support for movement in opposite directions, a transducer cell shiftably mounted on said elongated member and including a hollow body defining a reservoir containing a quantity of liquid, one end of said transducer body being provided with a hole, a rod extending inwardly of said transducer body through said hole and having an end disposed adjacent said reservoir, movement of said rod inwardly of said transducer body being effective to place said liquid under pressure, a shaft mounted on said elongated member for movement in opposite directions, one end of said shaft being secured to said one end of said transducer body in the vicinity of the said hole and having a longitudinally extending bore to receive the outwardly extending portion of the said rod, said shaft being provided with a transverse slot located adjacent the end of said bore and with a transverse hole spaced from the transverse slot in a direction away from said transducer body, a first and a second pin disposed in said hole and slot respectively, said first pin being restrained from movement relative to said shaft in the direction of the longitudinal axis thereof, said second pin being engaged by the opposite end of said rod, said elongated member being provided with slots to receive the pins of the transverse hole and slot of the shaft, said member being disposed on said support such that when said member is moved in one direction relative to the said suppport, the first transverse pin engages said support and is restrained from movement whereas the said second transverse pin moves in said one direction and moves said rod inwardly of said transducer body, and when said member is moved in the opposite direction the said second transverse pin engages said support and is restrained from movement whereas the first transverse pin moves in said opposite direction and causes movement of said transducer body in the direction of said rod, and means connected to said transducer and adapted to indicate the force required to create the said fluid pressure.

6. A force measuring system comprising a support; a member mounted on said support for movement in opposite parallel directions; a transducer cell; a shaft fixedly secured to one end of said transducer cell telescopically arranged with respect to said member and shiftable relative thereto in said opposite parallel directions; said shaft being provided with a longitudinal bore communicating with the interior of said cell; an elongated element projecting from the interior of the cell onto said bore and movable inwardly and out of said cell in said opposite parallel directions; a medium within said cell engageable by the movable element and adapted to be placed under pressure incident to relative movement between said cell and element in the direction of each other; first pin means projecting laterally from said shaft and mounted in stationary relation relative thereto; an opening in said shaft located at the inner end of the bore of said shaft; second pin means disposed within said shaft opening and dimensioned so as to permit relative movement between said second pin means and said shaft in said opposite parallel directions; said second pin means being in engagement with an end of said elongated element so as to effect movement thereof relative to said shaft upon relative movement between said shaft and said second pin means; said first and second pin means being each located in first and second openings respectively in each said support and member; said openings being dimensioned so as to permit relative movement between each of said pin means and each said support and member in said opposite parallel directions; an edge of said first opening of said support being positioned so as to preclude movement of said first pin means, said shaft, and said cell in one of said opposite parallel directions relative to said support; an edge of said second openings of said member being positioned so as to engage said second-pin means and effect movement of said second pin means relative to said support, said shaft and said cell when said member is moved in said one direction, thereby causing movement of said element inwardly of said cell when said member is so moved and placing said medium under pressure; an edge of said first opening of said member being located so as to engage and effect movement of said first pin means and said shaft relative to said support when said member is moved in the other of said opposite parallel directions; an edge of said second opening of said support being located so as to preclude movement of said second pin means and said element in said other of said opposite parallel directions so that when said member is moved in said other direction said cell is moved in the direction of said element so as to place said medium under pressure; and means communicating with said medium adapted to indicate the force creating the pressure under which said medium is placed.

7. A force measuring system comprising a transducer cell including a hollow body defining a reservoir containing a quantity of liquid, one end of said transducer body being provided with an opening, a rod extending inwardly of said transducer body through said opening and having an end disposed adjacent said reservoir, movement of said rod inwardly of said body being effective to place said liquid under pressure, a hollow shaft secured to said transducer body and extending outwardly therefrom in surrounding relation to said opening and said rod and including an axial bore wherein said rod is slidably received, a transverse hole in said shaft spaced from said transducer body, a first pin in said hole projecting outwardly past each side thereof, said first pin being dimensioned so as to preclude significant relative movement of said shaft and said first pin in directions parallel to the longitudinal axis of said shaft, a transverse slot in said shaft intermediate said hole and said transducer cell, said slot being elongated in the direction of the longitudinal axis of said shaft and located adjacent the end of said bore so as to position the end of said rod within said slot, a second pin disposed within said slot and projecting outwardly at each side thereof, said pin having a dimension measured in the direction of elongation of said slot less than the dimension of said slot in such direction and such as to enable it to be positioned in abutting relation to the wall of the slot opposite the end of the bore of the shaft with the end of said rod of said transducer in contact therewith, a pair of co-parallel walls adjacent each side of said shaft each having openings to receive each said first and second pins, said openings being elongated in the direction of the longitudinal axis of said shaft but having the portions of said wall defining adjacent edges of the holes of said wall spaced from each other a distance equal to the distance between the adjacent surfaces of said slot and hole of said shaft and providing a space between the opposite edge of each opening and the respective pin, means for maintaining one of said co-parallel walls stationary incident to movement of the other wall in one of two opposite directions parallel to the longitudinal axis of said shaft and in the other of said two opposite directions, and means communicating with said liquid adapted to indicate the force creating the pressure under which said liquid is placed.

References Cited by the Examiner
UNITED STATES PATENTS

| | | | |
|---|---|---|---|
| 528,779 | 11/1894 | Kellogg | 73—379 |
| 535,053 | 3/1895 | Day | 73—379 |
| 3,174,343 | 3/1965 | Kasulis | 73—379 |

JAMES J. GILL, *Acting Primary Examiner.*

RICHARD C. QUEISSER, *Examiner.*

J. J. SMITH, *Assistant Examiner.*